Patented Oct. 25, 1949

2,486,353

UNITED STATES PATENT OFFICE 2,486,353

COATING COMPOSITIONS COMPRISING REACTION PRODUCTS OF PENTAERYTHRITOL AND BODIED TRIGLYCERIDE DRYING OILS

Howard C. Woodruff, Mamaroneck, N. Y., assignor to Heyden Chemical Corporation, New York, N. Y., a corporation of Delaware No Drawing. Application July 24, 1943,
Serial No. 496,046

13 Claims. (Cl. 106—222)

This invention relates to esters of pentaerythritol and to ether-esters of pentaerythritol suitable for use as film-forming ingredients in coating compositions. The products of this invention may be classed as drying oils or as oleoresinous varnishes.

It is an object of my invention to produce pentaerythritol-complex-ether reaction products which may be used in a variety of further esterification reactions to produce useful coating materials.

It is further an object of my invention to utilize the technically valuable but hitherto unused complex ethers present in neutral heat-treated drying oils to produce coating materials bases which dry rapidly and have excellent durability.

It is well known that when glycerine is heated with oils such as linseed oil, soya oil, perilla oil, etc., at temperatures of 520–540° F. (271–282° C.), the glycerine slowly dissolves in the oil and mono- or di-glycerides of the fatty acids originally present in the oil are formed. However, when treated in a similar manner and under similar conditions, pentaerythritol acts quite differently from glycerine. When pentaerythritol is heated with linseed oil, the pentaerythritol remains on the bottom of the utensil in a distinctly separate layer, and eventually becomes charred. If the temperature of the reaction is increased substantially above that required for the glycerine reaction, i. e., to approximately 550–570° F. (288–299° C.), the charring is more rapid and the pentaerythritol gradually forms undesirably dark colored and partially unreactable decomposition products.

I have found, however, that substantially neutral heat-bodied linseed oil, substantially neutral heat-bodied soya oil, and substantially neutral heat-bodied oils of similar type, react entirely differently from the alkali-refined unbodied oils with pentaerythritol. The pentaerythritol easily dissolves in linseed oil which has been heat-treated and thickened to a Z viscosity, or greater. In fact, the reaction is substantially complete in a shorter time than that required to combine glycerine with alkali-refined oil. Practically any proportion of pentaerythritol may be used, although the most practical proportions are in the range of 15 parts or less of pentaerythritol to 100 parts of oil.

I have found that the reaction of pentaerythritol with substantially neutral heat-thickened oils is a practical method for the introduction of pentaerythritol into drying or other triglyceride oils. With air-blown bodied oils, the reaction with pentaerythritol is even more rapid.

The following theoretical discussion should not be so construed as to limit the scope or to restrict the use of this invention, since it is intended only as an aid in the interpretation and use of the invention disclosed herein:

When a glyceride ester of drying oil acids such as the natural drying oils or a synthetically prepared glycerol ester is heated to a bodying temperature, three well-known outstanding results occur:

1. The viscosity of the oil increases.
2. The iodine value of the oil decreases.
3. The acid number of the oil increases.

The reasons for obtaining such results may be explained by the following theoretical consideration.

The drying oil may polymerize by the junction of two oil molecules through an unsaturated double bond, as evidenced by a decrease in iodine value. During heating, drying oils also may release fatty acids or fatty acid anhydrides and other decomposition products (as evidenced by a loss in weight and increase in acid value) with the concurrent formation of highly complex ethers. One such complex ether is indicated in the following reaction:

Reaction A

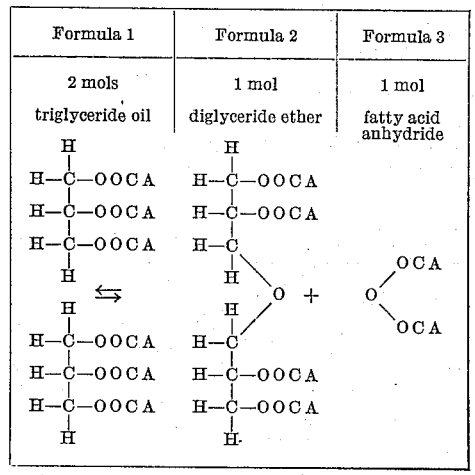

The investigations of T. F. Bradley, "Industrial and Engineering Chemistry," volume 29, No. 5, page 570, indicate the presence of polyglyceride ethers in heat-treated linseed oil. The complex ethers formed as a result of heat-bodying linseed oil and similar triglyceride oils, impart to the heat-treated oil an increased viscosity due to their increased molecular weight. The chemical conduct of the heat-thickened oil, due to its content of complex ethers, in place of fatty acid triglycerides, is entirely different from that of the raw or non-heat-treated oils. In the prior art, no utility of the complex ethers has been realized.

The complex ethers have a higher viscosity due to increase in molecular weight. Their chemical conduct is entirely different from that of the triglyceride oil. This latter reaction is limited in triglyceride oils, however, by the fact that fatty acids or fatty acid anhydrides, or other materials that are formed, tend to cause the reaction A to stabilize or even to reverse itself when a fatty acid or anhydride is present in sufficient amounts. Consequently only slight utility of this ether-type reaction is attained.

An important feature of the present invention, however, is that the complex ether constituents of natural heat-bodied oil are caused to react with pentaerythritol, not by the alcoholysis reaction that the prior art suggests, but at the ether linkages with the elimination of water, as shown in the following equation.

of water is eliminated for each mol of pentaerythritol. Solution thereby takes place in the neutral heat-bodied oils at temperatures much lower that that at which even partial solution occurs in raw or non-heat-treated oils.

The important constituent of the oils for the purposes of the present invention are bodied oils, that is, oils containing a proportion of ether materials of the type shown in Reaction A, Formula 2. The approximately pure, raw or unbodied, triglyceride oils may not alcoholize with pentaerythritol fast enough to prevent the pentaerythritol from forming undesirable products before alcoholysis takes place. In the case of bodied oils, however, pentaerythritol, in addition to alcoholysis, may react at the ether linkage of Formula 2, Reaction A, with the elimination of water, as shown in Reaction B.

The process of the present invention thus contemplates the reaction of pentaerythritol with complex ethers contained in neutral heat-bodied triglyceride oils, in which reaction water is eliminated. Due to the poly-functionality of the products so derived, they are useful in the preparation of a variety of new materials as follows:

Reaction B

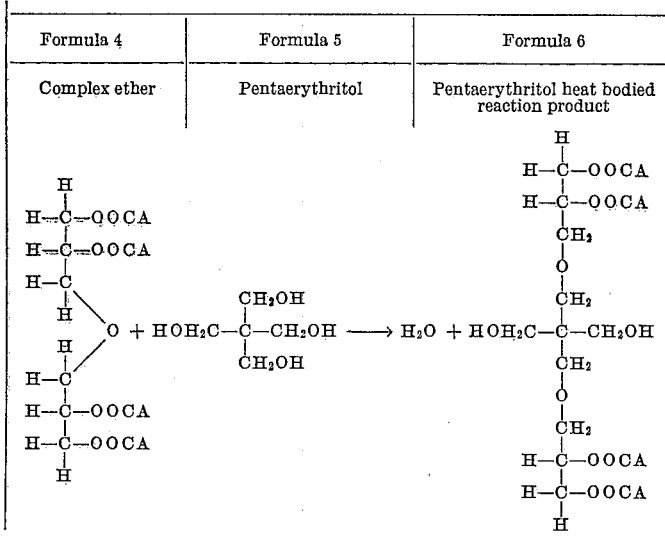

| Formula 4 | Formula 5 | Formula 6 |
|---|---|---|
| Complex ether | Pentaerythritol | Pentaerythritol heat bodied reaction product |

In this reaction it will be noted that the diglyceride ether is split and the two parts unite at different hydroxyl groups of the pentaerythritol when the ether and pentaerythritol are in equal molecular proportions. When a smaller amount of pentaerythritol is used more complex materials may also be formed, such as:

1. The pentaerythritol-heat-bodied oil reaction product, obtained as above, and as illustrated in Examples 1 and 2, which results from elimination of water between pentaerythritol and complex ethers, being alcoholic in character, may be utilized to neutralize acid synthetic or natural resins and thus produce substantially neutral resin-

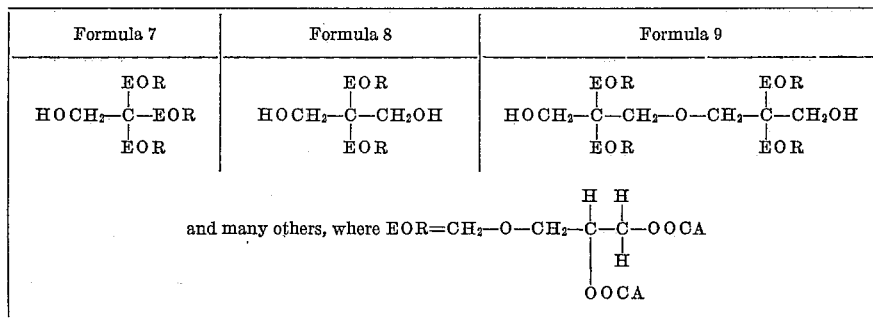

| Formula 7 | Formula 8 | Formula 9 |
|---|---|---|

This is an entirely distinct reaction from the alcoholysis recation, since in alcoholysis reactions no water is eliminated, while in this case one mol pentaerythritol ether-drying oil combinations which, with proper siccatives and thinners, form the basis of excellent coating materials, such as varnishes, enamel vehicles, air-drying resins, bake finishes or adhesives.

2. The pentaerythritol-heat-bodied oil reaction product obtained as above, which results from elimination of water between pentaerythritol and complex ethers, being alcoholic in character, may be neutralized by reaction with complex monocarboxylic acids such as benzoylbenzoic acid, toluylbenzoic acid, naphthoylbenzoic acid, and similar acids, or fatty acids derived from drying oils, or other complex acids. These neutral pentaerythritol oils are very rapid bodying, have greatly shortened gel times, dry rapidly, and have unusual water and reagent resistance. The pentaerythritol-heat-bodied oil reaction product when compounded with neutral or acidic varnish resins, such as ester gum, maleic-rosin-ester resins, rosin-modified phenol resins, and pyrogenated natural resins, forms the basis of excellent varnishes, enamels, vehicles, air-drying resins, baking finishes, and/or adhesives.

3. The pentaerythritol-neutral-heat-bodied oil combination reaction product obtained as above described, which results from elimination of water between pentaerythritol and complex ethers, and which contains free hydroxyl groups, may be held for a prolonged period at considerably elevated temperatures until substantial quantities of volatile material are driven off. This will form a clear homogeneous product of considerably increased viscosity over the original material. It is useful as such in various types of coating materials, and has greatly improved water resistance and drying time over the original oil. When used as a base for varnish cooking by methods well known to those skilled in the art, it will be found to increase in viscosity more rapidly than the untreated oil, and coatings based on this oil will dry more rapidly and produce more resistant, more durable and harder films than similar coatings based on the untreated oil.

In addition to having found that bodied or thickened oils react easily and quickly with pentaerythritol, it has also been found that highly complex acids or natural acidic resins dissolved in such bodied oils, or even in raw, unbodied oils, produce solutions which react completely, rapidly, and smoothly with pentaerythritol to form homogeneous, clear products. The proportion of pentaerythritol used with such a combination of oil and resin may be considerably in excess of that required to neutralize the acidic ingredient. Such combinations of acidic resins, oils, and pentaerythritol may be further heat-treated and used as a coating composition per se, or may be further reacted with other acidic material to yield a neutral oil. When an acidic material and a raw oil are used with pentaerythritol, the mechanism of the reaction with pentaerythritol is the same as that described above with a bodied oil, except that the acidic natural resin material reacts with a portion of the pentaerythritol, which is thus kept in reaction as a mono-ester of pentaerythritol, and continuously reacts with the diglyceride ether as it is formed. In this case the pentaerythritol need not necessarily be in excess of the amount required to form the pentaerythritol mono-ester of the acidic material used.

As will be apparent, the scope of the invention is not limited to derivatives of drying oil acid glycerides, but is broadly applicable to glyceride esters of fatty acids, both of the drying and non-drying variety.

The following examples are for purposes of illustration only, and should not be so construed as to limit the inventions either in proportion or scope. Viscosities or bodies referred to herein are expressed as values on the Gardner-Holdt Bubble Viscometer scale ("Physical and Chemical Examination of Paints, Varnishes, Lacquers and Colors," by Henry A. Gardner, Ninth Ed., May, 1939, Washington, D. C. Institute of Paint and Varnish Research, page 216).

*Comparison Example 1*

Twenty-five (25) parts pentaerythritol and 200 parts alkali-refined linseed oil were mixed and heated to 540° F. At approximately 500° F. the pentaerythritol melted and formed a lower layer. When held at 540° F., the lower layer darkened, and in approximately 15 minutes charred.

*Comparison Example 2*

Twenty-five (25) parts pentaerythritol and 200 parts alkali-refined linseed oil were heated to 560° F. The pentaerythritol formed a lower layer. At the 550-560° F. range, many fumes came off, and charring of the lower layer occurred in about 5 minutes.

*Example 1*

Twenty-five (25) parts pentaerythritol and 200 parts body Z linseed oil were heated to 540° F. A clear mix formed at 540° F., and it was necessary to keep stirring to prevent foaming over. The heating was slowed down after about 15-20 minutes. Most of the foam subsided, and the mix was slightly cloudy on glass. The batch was then held at 560-570° F. for 15 minutes, until clear on glass. When cooled, a homogeneous oil resulted.

*Example 2*

Two hundred (200) parts body Z linseed oil and 5 parts pentaerythritol were heated to 540° F. with only slight stirring. The pentaerythritol dissolved to a clear mix almost at once. Some foaming was noticed. The mixture was held at 560-570° F. for 15 minutes to assure clear drys. A homogeneous clear oil formed having a viscosity of Z-3.

*Example 3*

Two hundred (200) parts K blown linseed oil and 5 parts pentaerythritol were mixed. The mixture was held at 480° F., with considerable foaming, until a clear dark oil resulted.

*Example 4*

The product obtained in Example 2 was held at 530° F. for 2 hours until the loss in weight became constant. The oil was cooled; it had considerably increased in viscosity. Two hundred (200) parts of this bodied oil were heated with 100 parts ester gum to 565° F. and allowed to cool to 450° F. Three hundred (300) parts mineral thinner and 1 part 6% cobalt naphthenate were added. The resulting varnish had a D viscosity and a Gardner color of 15. It dried rapidly to a tough, durable coating of unusually good hardness.

*Example 5*

Rosin-modified maleic resin was substituted for ester gum in Example 4. The resultant varnish had a viscosity of G-H and a Gardner color of 16. It dried in about 4 hours to a tough, durable coating which had excellent adhesion and was not affected after 24 hours immersion in cold water.

Example 6

| | Parts |
|---|---|
| Pentaerythritol-modified linseed oil as obtained in Example 1 | 100 |
| Linseed oil heat thickened to viscosity Z | 100 |
| Rosin-modified phenolic resin | 100 |
| 6% cobalt naphthenate | 2 |
| Mineral thinner | 300 |

The oils and resin were heated to 560° F. and held until the acid number dropped below 10, which required 1¼ hours. When cooled to 400° F., the mineral thinner and drier were added. The resultant composition had a color of 12 and a viscosity of H. It dried in 5½ hours to a durable coating with unusually good hardness and durability. After storage for 3 years, the can stability was excellent. The viscosity had increased only to M.

Example 7

| | Parts |
|---|---|
| Oil from Example 1 | 100 |
| Oil from Example 2 | 100 |
| American wood rosin, WW grade | 100 |
| 6% cobalt naphthenate | 2 |
| Mineral thinner | 300 |

The oils and rosin were heated at 550° F. until the acid number dropped below 10, which required 2½ hours. When cooled to 400° F., the mineral spirits and cobalt naphthenate were added. The resultant composition had a viscosity of F and a Gardner color of 11. It was a fast drying, durable coating material with unusually good hardness and durability.

Example 8

A mixture of 1,000 parts of oil from Example 1 and 150 parts of benzoylbenzoic acid was heated to 530° F. and held until the acid value dropped below 10, which required about 2 hours. When allowed to cool an oil was produced which had a viscosity greater than Z-6.

Example 9

A mixture of 1,000 parts each of oil from Example 1, oil from Example 2, and linseed oil fatty acids was heated to 530° F. and held for an acid value less than 10, which required 2¾ hours. An oil having Z-1 to Z-2 viscosity was obtained. The two oils from Examples 1 and 2 were used solely for the purpose of obtaining an oil corresponding to 15 parts of pentaerythritol to 200 parts of body Z linseed oil.

Example 10

A mixture of 1,000 parts each, of oil from Example 1 and cotton seed oil fatty acids was heated to 530° F. and held for an acid value less than 10, and allowed to cool. A viscous oil was produced, suitable as an adhesive and as a base for elastics.

Example 11

| | Parts |
|---|---|
| Phenolic-modified ester gum | 100 |
| Oil from Example 8 | 200 |
| 6% cobalt naphthenate | 1 |
| Mineral thinner | 300 |

The resin and one-quarter of the oil were heated to 565° F. and held for a clear drop on a glass plate. When clear, the remaining oil was added, and the batch heated to 565° F. and held for a clear drop. When cooled to 400° F., the thinner and cobalt naphthenate were added. The resultant composition dried in 4 hours to a durable coating with unusually good hardness. After storage for more than one year, the can stability was excellent except for an increase in viscosity from K to L-M.

Example 12

Two hundred fifty (250) parts of linseed oil bodied to a Gardner viscosity of X-Y and 31.8 parts of technical pentaerythritol were heated to 536° F., at which temperature the pentaerythritol dissolved in the bodied oil. An analysis of the resulting pentaerythritol-modified linseed oil showed that it had 3.8% of its weight as hydroxyl groups. To 150 parts of this oil, 136 parts of wood rosin were added and the mixture was held at 536° F. for 2 hours. The resulting product was a short oil varnish of good color and excellent gloss.

Having thus described my invention, what I claim as new and desire to secure by Letters Patent is:

1. A composition suitable for reaction with acidic materials to provide bases for coating compositions which comprises a homogeneous reaction product obtained by heating at a temperature of approximately 540° F. and in the absence of a catalytic substance promoting alcoholysis approximately 15 parts by weight of pentaerythritol and approximately 200 parts by weight of a substantially neutral heat-bodied linseed oil having a viscosity of approximately Z.

2. A composition suitable as a base for coating compositions which consists essentially of the product of the substantially complete esterification with approximately 100 parts by weight of linseed oil fatty acids of approximately 200 parts by weight of a homogeneous reaction product obtained by heating at a temperature of approximately 540° F. in the absence of a catalytic substance promoting alcoholysis approximately 15 parts by weight of pentaerythritol and approximately 200 parts by weight of a substantially neutral heat-bodied linseed oil having a viscosity of approximately Z.

3. A composition suitable as a base for adhesive compositions which consists essentially of the product of the substantially complete esterification with approximately 100 parts by weight of cottonseed oil fatty acids of approximately 100 parts by weight of a homogeneous reaction product obtained by heating at a temperature of approximately 540° F. in the absence of a catalytic substance promoting alcoholysis approximately 25 parts by weight of pentaerythritol and approximately 200 parts by weight of a substantially neutral heat-bodied linseed oil having a viscosity of approximately Z.

4. A process for producing a composition suitable for reaction with acidic materials to provide bases for coating compositions which comprises heating with stirring at a temperature of approximately 540° F. approximately 15 parts by weight of pentaerythritol and approximately 200 parts by weight of a substantially neutral heat-bodied linseed oil having a viscosity of approximately Z in the absence of a catalytic substance promoting alcoholysis and maintaining said temperature until a homogeneous product is obtained.

5. A process for producing a base for coating compositions which comprises heating together approximately 200 parts by weight of a homogeneous reaction product obtained by heating at a temperature of approximately 540° F. approximately 15 parts by weight of pentaerythritol and approximately 200 parts by weight of a substantially heat-bodied linseed oil having a viscosity of approximately Z in the absence of a catalytic substance promoting alcoholysis with 100 parts by weight of linseed oil fatty acids at a temperature of approximately 530° F. until a homogeneous oil having a viscosity of at least Z–1 and an acid number less than approximately 10 is obtained.

6. A process of producing a coating composition which comprises heating together approximately 200 parts by weight of a homogeneous reaction product obtained by heating at a temperature of approximately 540° F. approximately 15 parts by weight of pentaerythritol and approximately 200 parts by weight of a substantially heat-bodied linseed oil having a viscosity of approximately Z in the absence of a catalytic substance promoting alcoholysis with approximately 100 parts by weight of wood rosin at a temperature of approximately 550° F. until a product having an acid number less than approximately 10 is obtained, and subsequently cooling the product and adding approximately 2 parts by weight of a cobalt naphthenate siccative containing approximately 6% cobalt and approximately 300 parts by weight of mineral spirits.

7. A composition suitable for reaction with acidic materials to provide bases for coating compositions which consists essentially of a homogeneous reaction product containing a substantial proportion of unesterified hydroxyl radicals obtained by heating in the absence of a catalytic substance promoting alcoholysis a substantially neutral heat-bodied triglyceride drying oil having a viscosity of at least approximately Z and pentaerythritol in excess of the amount required to esterify the free acids initially present in said bodied oil and in a proportion within the range of approximately 2.5 to 15 parts by weight to each 100 parts by weight of the bodied triglyceride drying oil.

8. A composition as defined in claim 7 in which the substantially neutral heat-bodied triglyceride drying oil is linseed oil.

9. A composition as defined in claim 7 in which the substantially neutral heat-bodied triglyceride drying oil is soybean oil.

10. A composition suitable as a base for coating compositions which consists essentially of the product of the substantially complete esterification with an oil fatty acid of a homogeneous reaction product as defined in claim 7.

11. A composition suitable as a base for coating compositions which consists essentially of the product of the substantially complete esterification with linseed oil fatty acids of a homogeneous reaction product as defined in claim 7.

12. A process for the production of a composition suitable for reaction with acidic materials to provide bases for coating compositions which comprises heat-bodying a triglyceride drying oil until its viscosity is at least Z, thereafter adding to 100 parts by weight of said heat-bodied oil from 2.5 to 15 parts by weight of pentaerythritol and heating said mixture at a temperature of approximately 540° F. in the absence of a catalytic substance promoting alcoholysis for a period sufficient to produce a homogenous product.

13. A process for the production of a base for coating compositions which comprises heat-bodying a triglyceride drying oil until its viscosity is at least Z, thereafter adding to 100 parts by weight of said heat-bodied oil from 2.5 to 15 parts by weight of pentaerythritol and heating said mixture at a temperature of approximately 540° F. in the absence of a catalytic substance promoting alcoholysis for a period sufficient to produce a homogeneous product and subsequently heating the said product with such an amount of a drying oil fatty acid that the acid number of the resulting product is less than 10 and the viscosity is at least approximately Z.

HOWARD C. WOODRUFF.

REFERENCES CITED

The following references are of record in the file of this patent:

UNITED STATES PATENTS

| Number | Name | Date |
|---|---|---|
| 2,077,371 | Rheineck | Apr. 13, 1937 |
| 2,317,487 | Schuelke | Apr. 27, 1943 |
| 2,346,409 | Anderson | Apr. 11, 1944 |
| 2,348,708 | Bradley | May 16, 1944 |
| 2,360,393 | Burrell | Oct. 17, 1944 |
| 2,363,016 | Oertling | Nov. 21, 1944 |

FOREIGN PATENTS

| Number | Country | Date |
|---|---|---|
| 428,864 | Great Britain | 1935 |

Certificate of Correction

Patent No. 2,486,353　　　　　　　　　　　　　　　　　　　　October 25, 1949

HOWARD C. WOODRUFF

It is hereby certified that error appears in the printed specification of the above numbered patent requiring correction as follows:

Column 2, line 49, after the last ruled line of the table, insert *where A= radical of fatty acid.*;

and that the said Letters Patent should be read with this correction therein that the same may conform to the record of the case in the Patent Office.

Signed and sealed this 21st day of February, A. D. 1950.

[SEAL]

THOMAS F. MURPHY,
*Assistant Commissioner of Patents.*